(12) United States Patent
Itou et al.

(10) Patent No.: US 8,016,337 B2
(45) Date of Patent: Sep. 13, 2011

(54) PICK-UP STYLE UTILITY VEHICLE WITH EXPANDABLE CARGO BED

(75) Inventors: Kouji Itou, Akashi (JP); Hideyuki Kato, Akashi (JP); Kenji Oda, Akashi (JP); Kousei Hokari, Miki (JP); Hirokazu Morita, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 12/647,884

(22) Filed: Dec. 28, 2009

(65) Prior Publication Data

US 2011/0156434 A1    Jun. 30, 2011

(51) Int. Cl.
*B62D 25/00* (2006.01)
(52) U.S. Cl. .................. 296/26.1; 296/26.09; 296/26.11; 296/66; 296/183.1
(58) Field of Classification Search ............... 296/26.08, 296/26.09, 26.1, 26.11, 66, 183.1, 190.11
See application file for complete search history.

(56) References Cited

U.S. PATENT DOCUMENTS

| | | | | |
|---|---|---|---|---|
| 4,941,782 | A * | 7/1990 | Cook ........................... | 408/147 |
| 6,398,291 | B1 * | 6/2002 | Reusswig et al. .......... | 296/186.4 |
| 6,905,159 | B1 | 6/2005 | Saito et al. | |
| 6,994,388 | B2 | 2/2006 | Saito et al. | |
| 7,249,798 | B2 | 7/2007 | Saito et al. | |
| 2005/0184548 | A1 * | 8/2005 | Saito et al. ................. | 296/26.09 |
| 2006/0131911 | A1 * | 6/2006 | Lim et al. ................... | 296/26.08 |
| 2007/0216195 | A1 * | 9/2007 | Furman ...................... | 296/183.1 |
| 2009/0256388 | A1 * | 10/2009 | Tanaka et al. .............. | 296/186.4 |

* cited by examiner

*Primary Examiner* — Lori Lyjak
(74) *Attorney, Agent, or Firm* — Wenderoth, Lind & Ponack, L.L.P.

(57) ABSTRACT

A pick-up style utility vehicle according to the present invention has a front seat, a rear seat, and a cargo bed in this order from front. The cargo bed is changeable between an expanded state in which the cargo bed is expanded forward to a rear riding space in front of the cargo bed and a non-expanded state not occupying the rear riding space. The rear seat forms side panels of the expandable portions of the cargo bed in the expanded state.

6 Claims, 10 Drawing Sheets

PICK-UP STYLE UTILITY VEHICLE WITH EXPANDABLE CARGO BED

BACKGROUND OF THE INVENTION

1. Field of the Invention

The present invention relates to a pick-up style utility vehicle which can expand a cargo bed in a front direction so as to optimize an area or capacity of a cargo bed space or a passenger space according to user demands.

2. Description of the Related Art

At present, utility vehicles of various styles are used. Other than a pick-up style utility vehicle with a relatively large cargo bed behind a seat, there is a straddle-type all terrain vehicle having a handle bar, or the like.

Typically, the pick-up style utility vehicle is more practical than the handle bar type utility vehicle belonging to the straddle-type all terrain vehicle. The pick-up style utility vehicle is used for hunting in fields and mountains, conveyance of lumber, movement in golf courses, golf course maintenance, and the like.

The present applicants have formerly applied the inventions relating to the pick-up style utility vehicle with a cargo bed whose area or capacity can be expanded. Their applications have been filed, which are, for example, U.S. Pat. Nos. 6,905,159, 6,994,388, and 7,249,798.

A configuration of the pick-up style utility vehicle disclosed in the respective documents has a front seat including a driver's seat, a rear seat, and a cargo bed in this order from front. The rear seat is changed between a used state and a retracted state to switch between 2 passengers transformation and 4 passengers transformation. In the 2 passengers transformation, a front portion of the cargo bed can be expanded to a riding space occupied by the rear seat in the used state.

FIG. 19 is a left side view in 4 passengers transformation of a pick-up style utility vehicle disclosed in the related art documents. A bench-shaped front seat 81 has a seat leg 811 erected on a floor surface 821 of a cabin 82, a seat bottom 812 provided on the upper end face of the seat leg 811, and a backrest 813 fixed via supporting stays to the seat bottom 812. The bench-shaped front seat 81 is typically extended leftward and rightward to near the left and right ends of the cabin 82, so that two persons can be seated side by side. A driver can be seated on one seating area (left side) and a passenger can be seated on the other seating area. A bench-shaped rear seat 83 has a seat bottom 831 arranged on the upper side of a box 84 housing an engine (not shown) and a backrest 832. Like the front seat 81, the seat bottom 831 and the backrest 832 are extended leftward and rightward to near the left and right ends of the cabin 82, so that two persons can be seated side by side.

The folding configuration of the rear seat 83 will be described in detail. The seat bottom 831 is fixed onto the upper surface of a supporting base 833. The front end of the supporting base 833 is rotatably supported at the front upper end of the box 84 via a hinge 834. A pair of right and left stays 835 extended in a downward direction is fixed onto the backrest 832. The lower end of each of the stays 835 is rotatably coupled to the rear end of the seat bottom 831 via a hinge 836.

FIG. 20 is a left side view in 2 passengers transformation of a pick-up style utility vehicle disclosed in the related art documents. The backrest 832 is rotated about the hinge 836 so as to be brought into contact with the upper surface of the seat bottom 831. The seat bottom 831 is then rotated about the hinge 834 together with the backrest 832 so as to be substantially vertical. The rear seat 83 is folded in the retracted state.

The rear seat 83 is folded and retracted to use a rear portion riding space P1 as the forward expanded space of a cargo bed 85.

The cargo bed 85 has, as a basic configuration, a stationary bottom plate 851, a pair of stationary side panels 852 provided substantially perpendicular to the stationary bottom plate 851 along the left and right ends of the stationary bottom plate 851, an openable and closeable gate type rear panel 853 provided at the rear end of the stationary bottom plate 851, and a front panel 854 position adjustable forward and rearward. In addition to these members, as shown in FIG. 20, the cargo bed 85 has a pair of left and right expandable side panels 855 to expand the cargo bed 9 forward.

When the pick-up style utility vehicle of the related art is changed from 4 passengers transformation to 2 passengers transformation to expand the cargo bed 85, the rear seat 83 is folded and retracted. The expanding space of the cargo bed 85 is reduced by the thickness of the rear seat 83.

In addition, the expandable side panels 855 of the cargo bed 85 are additionally necessary to expand the cargo bed 85.

SUMMARY OF THE INVENTION

The present invention has been made in view of the above problems and an object of the present invention is to increase the expanding space of a cargo bed and to be in no need of expandable side panels of the cargo bed.

To achieve the above object, the present invention provides a pick-up style utility vehicle having a front seat, a rear seat, and a cargo bed in this order from front, wherein the cargo bed is changeable between an expanded state in which the cargo bed is expanded forward to a rear riding space in front of the cargo bed and a non-expanded state not occupying the rear riding space, and the rear seat forms the side panels of the expandable portions of the cargo bed in the expanded state.

With the above configuration, the rear seat forms the side panels of the expandable portions of the cargo bed, and thus the cargo bed can be expanded more largely than the related art in which the rear seat is folded forward. In addition, the rear seat forms the side panels of the expandable portions of the cargo bed. Therefore, the expandable side panels need not be additionally provided so that the configuration of the cargo bed can be simplified.

According to the present invention, preferably, the rear seat can be divided into a first member and a second member to the left and right, and in the expanded state, the first member forms one side panel of the expandable portion of the cargo bed and the second member forms the other side panel of the expandable portion of the cargo bed.

With the above configuration, the left and right side panels of the expandable portions of the cargo bed can be easily formed by the rear seat.

According to the present invention, preferably, in the expanded state, a backrest for the rear seat forms the side panel of the expandable portion of the cargo bed.

With the above configuration, the backrest for the rear seat forms the side panel of the expandable portion of the cargo bed. The side panel of the expandable portion of the cargo bed can be formed more easily.

According to the present invention, preferably, the rear seat has a seat bottom and a backrest, and in the expanded state, the seat bottom and the backrest are arranged in a front-rear direction in a tandem manner to form the side panel of the expandable portion of the cargo bed.

With the above configuration, the side panel of the expandable portion of the cargo bed which is long in a front-rear direction can be formed.

According to the present invention, preferably, the rear seat has a seat bottom and a backrest, and in the expanded state, the backrest and the seat bottom are arranged in an up-down direction in a tandem manner to form the side panel of the expandable portion of the cargo bed.

With the above configuration, the side panel of the expandable portion of the cargo bed which is long in an up-down direction can be formed.

According to the present invention, preferably, in the configuration in which the rear seat can be divided into a first member and a second member, and in the expanded state, the first member forms one side panel of the expandable portion of the cargo bed and the second member forms the other side panel of the expandable portion of the cargo bed, the first member is coupled to the bottom portion of the utility vehicle by foldable first coupling means, the second member is coupled to the bottom portion of the utility vehicle by foldable second coupling means, the first member can be located outward of a vehicle body in a vehicle width direction by opening the folded first coupling means, and the second member can be located outward of the vehicle body in a vehicle width direction by opening the folded second coupling means.

With the above configuration, the first member and the second member can be located to the left and right outward in a vehicle width direction by the first coupling means and the second coupling means. The first member and the second member cannot be an obstacle in the forward movement at the time of the expansion of the cargo bed and the rearward movement at the time of the contraction of the cargo bed of the screen shield partitioning the cargo bed and the rear riding space in front of the cargo bed. Accordingly, the forward and rearward movement of the screen shield can be easily performed.

DETAILED DESCRIPTION OF THE PREFERRED EMBODIMENTS

First Embodiment of the Present Invention

Figure 1:
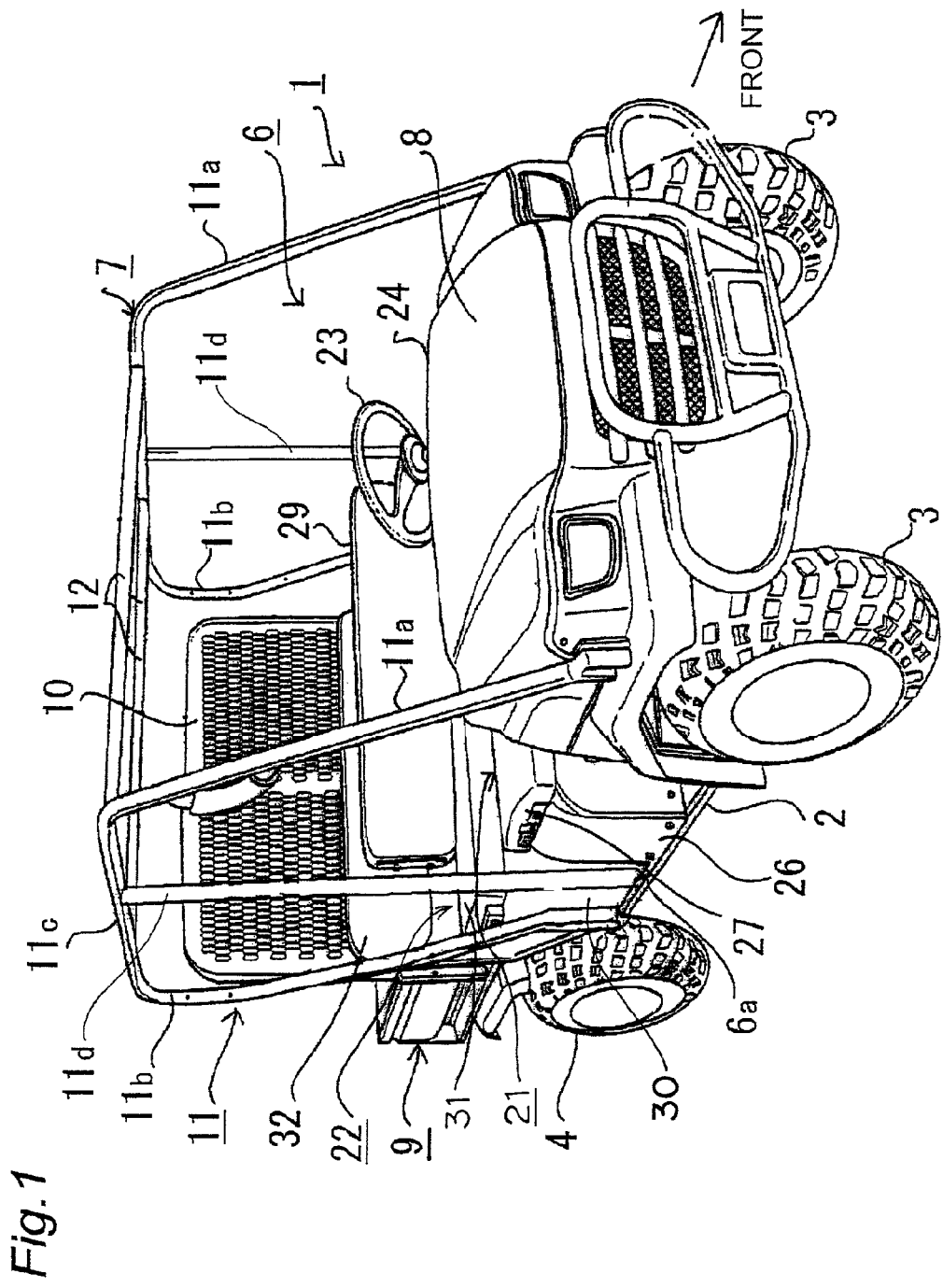
FIG. 1 is an overall perspective view of a pick-up style utility vehicle according to a first embodiment of the present invention.
Figure 2:
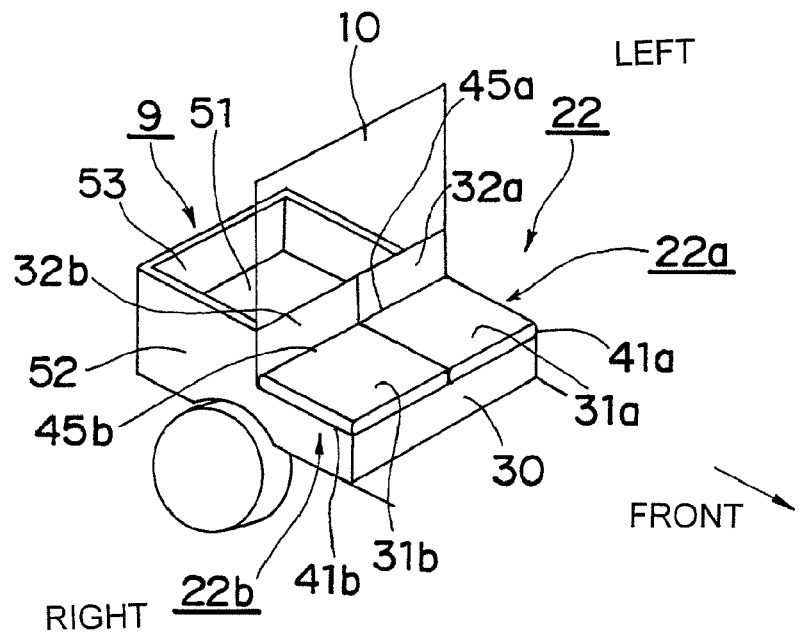
FIG. 2 is a schematic perspective view of a rear seat 22 and an expandable cargo bed 9 in 4 passengers transformation.
Figure 3:
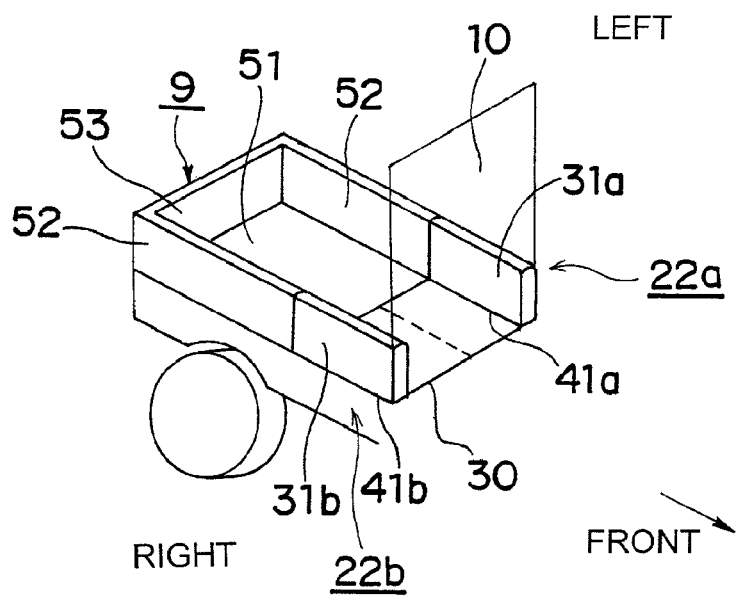
FIG. 3 is a schematic perspective view of the rear seat 22 and the expandable cargo bed 9 in 2 passengers transformation.

FIGS. 1 to 3 show a pick-up style utility vehicle 1 with an expandable cargo bed according to a first embodiment of the present invention. The pick-up style utility vehicle 1 is changeable between 4 passengers transformation contracting a cargo bed 9, as shown in FIGS. 2 and 2 passengers transformation expanding the cargo bed 9 forward, as shown in FIG. 3. The configuration of the pick-up style utility vehicle will be described below in detail with reference to the drawings.

FIG. 1 is a perspective view of the pick-up style utility vehicle 1. The pick-up style utility vehicle 1 has a vehicle body 2 supported by a pair of left and right front wheels 3 and a pair of left and right rear wheels 4. A cabin frame 7 configuring a cabin 6 is provided in an intermediate portion on the vehicle body 2 in a front-rear direction. A hood 8 is provided in front of the cabin frame 7. The cargo bed 9 is provided behind the cabin frame 7. A screen shield 10 partitioning the cargo bed 9 and a riding space is provided at the front end of the cargo bed 9 so as to be position changeable forward and rearward.

The cabin frame 7 surrounding the cabin 6 has a pair of left and right side frame members 11 formed in an inverted U-shape and made of metal pipes, and a cross frame member 12 made of a plurality of metal pipes coupling the side frame members 11. Each of the side frame members 11 has a front side portion 11a extended rearward and upward from near the left or right side portion of the hood 8, a rear side portion 11b extended substantially upward from the left or right side portion at the rear end of the cabin 6, an upper side portion 11c integrally coupling the upper end of the front side portion 11a and the upper end of the rear side portion 11b and extended forward and rearward, and an intermediate vertical portion 11d coupling the intermediate portion of the upper side portion 11c in a front-rear direction and a floor surface 6a.

A bench-shaped front seat 21 is installed in the front half portion of the cabin 6. A bench-shaped rear seat 22 is installed in the rear half portion of the cabin 6. A dashboard (operating portion) 24 having a steering wheel 23 and the like is provided at the front end of the cabin 6.

The bench-shaped front seat 21 has a seat leg 26 erected on the floor surface 6a of the cabin 6, a seat bottom 27 provided on the upper end face of the seat leg 26, and a backrest 29 fixed via supporting stays to the intermediate vertical portions 11d. The bench-shaped front seat 21 is typically extended leftward and rightward to near the left and right ends of the cabin 6, so that two persons can be seated side by side. A driver can be seated on one seating area (left side) and a passenger can be seated on the other seating area.

The bench-shaped rear seat 22 is arranged on the upper side of a box 30 storing an engine (not shown) and is divided into a first member (hereinafter, called a rear left seat) 22a and a second member (hereinafter, called a rear right seat) 22b to the left and right. The rear left seat 22a has a left seat bottom 31a and a left backrest 32a. The rear right seat 22b has a right seat bottom 31b and a right backrest 32b.

The left backrest 32a is rotated about a hinge 45a and is then folded on the left seat bottom 31a. Likewise, the right backrest 32b is rotated about a hinge 45b and is then folded on the right seat bottom 31b.

As shown in FIG. 3, the left seat bottom 31a is rotated about a hinge 41a and is then erected leftward so as to be in a substantially vertical state relative to the box 30. Likewise, the right seat bottom 31b is rotated about a hinge 41b and is then erected rightward so as to be in a substantially vertical state relative to the box 30.

The cargo bed 9 has a bottom plate 51, a pair of stationary side panels 52 provided substantially perpendicular to the bottom plate 51 along the left and right ends of the bottom plate 51, and an openable and closeable gate type rear panel 53 provided at the rear end of the bottom plate 51.

The operation of changing 4 passengers transformation shown in FIGS. 2 to 2 passengers transformation shown in FIG. 3 and expanding the cargo bed 9 will be described.

When 4 passengers transformation is changed to 2 passengers transformation, the left backrest 32a is rotated about the hinge 45a forward and is folded on the left seat bottom 31a. The right backrest 32b is rotated about the hinge 45b forward and is folded on the right seat bottom 31b.

The left seat bottom 31a on which the left backrest 32a is folded is rotated leftward about the hinge 41a and is erected leftward so as to be in a substantially vertical state to the box 30. The side panel of the expandable portion of the cargo bed 9 is formed in front of the stationary side panel 52 by the left seat bottom 31a. The right seat bottom 31b on which the right backrest 32b is folded is rotated rightward about the hinge 41b and is erected rightward so as to be in a substantially vertical state relative to the box 30. The side panel of the expandable portion of the cargo bed 9 is formed in front of the stationary side panel 52 by the right seat bottom 31b.

The screen shield 10 located in the rear portion of the rear seat 22 in 4 passengers transformation is moved forward and is attached in front of the left seat bottom 31a and the right seat bottom 31b forming the side panels of the expandable portions of the cargo bed 9. The pick-up style utility vehicle 1 is changed from 4 passengers transformation to 2 passengers transformation to expand the cargo bed 9.

As described above, in this embodiment, the rear seat 22 forms the side panels of the expandable portions of the cargo bed 9. As a result, the cargo bed can be expanded more largely than the related art in which the rear seat 22 is folded forward. In addition, the rear seat 22 forms the side panels of the expandable portions of the cargo bed 9. Therefore, expandable side panels need not be additionally provided so that the configuration of the cargo bed 9 can be simplified.

Iron plates are attached to the back surfaces of the left seat bottom 31a and the right seat bottom 31b. Preferably, the strength of the left seat bottom 31a and the right seat bottom 31b is increased and the strength of the side panels of the expandable portions of the cargo bed 9 is about the same as that of the stationary side panels 52. When the rear seat 22 forms the side panels of the expandable portions of the cargo bed 9, the back surfaces of the backrests 32a and 32b configure the left and right outer surfaces of the expandable side panels. Iron plates are attached to the back surfaces of the backrests 32a and 32b so that the rear seat 22 can be protected from any shocks and damage caused to the expandable side panels in 2 passengers transformation.

Modification Example 1 of the First Embodiment

Figure 4:
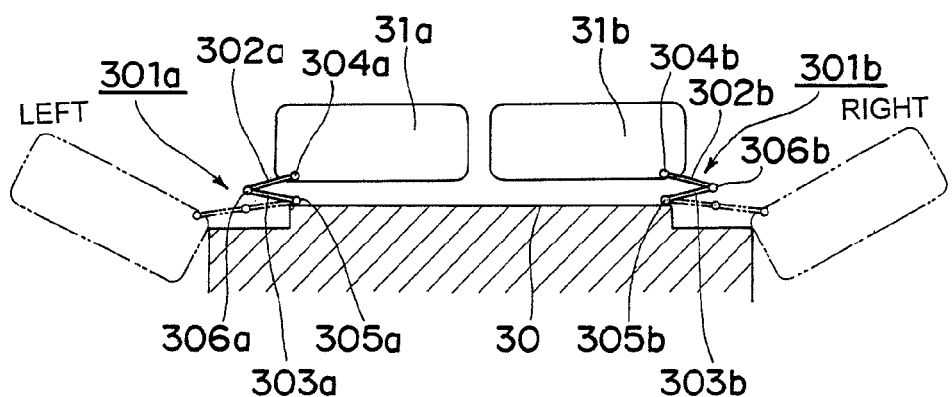
FIG. 4 is a schematic diagram of the coupling portions of the rear seat 22 and a box 30 in 4 passengers transformation showing a modification example of the first embodiment.
Figure 5:
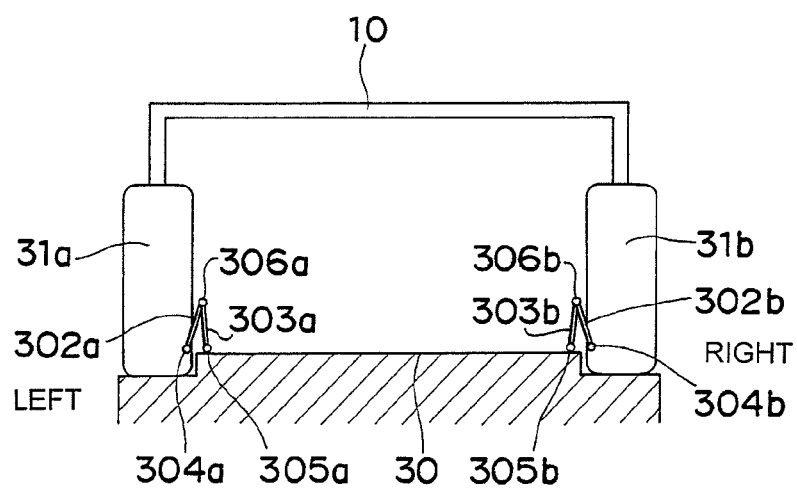
FIG. 5 is a schematic diagram of the coupling portions of the rear seat 22 and the box 30 in 2 passengers transformation.

FIGS. 4 and 5 are schematic diagrams of the coupling portions of the rear seat 22 and the box 30 showing a modification example of the first embodiment. As shown in FIG. 4, the left seat bottom 31a and the right seat bottom 31b of the rear seat 22 are coupled to the box 30 by first coupling means (link mechanism) 301a and second coupling means (link mechanism) 301b.

The link mechanism 301a has arms 302a and 303a and fulcrums 304a, 305a, and 306a. The left seat bottom 31a and the arm 302a are rotatably coupled via the fulcrum 304a. The box 30 and the arm 303a are rotatably coupled via the fulcrum 305a. The arms 302a and 303a are rotatably coupled via the fulcrum 306a. The link mechanism 301a is foldable with the fulcrum 306a as a start point. The configuration of the link mechanism 301b is the same as that of the link mechanism 301a. Specifically, the members according to the link mechanism 301b, that is, 302b, 303b, 304b, 305b, and 306b, have the same configuration as that of the members according to the link mechanism 301a, that is, 302a, 303a, 304a, 305a, and 306a.

When 4 passengers transformation shown in FIG. 4 is changed to 2 passengers transformation shown in FIG. 5, the folded link mechanism 301a is opened leftward with the fulcrum 306a as a start point and the arms 302a and 303a are on the substantially straight line via the fulcrum 306a. The left seat bottom 31a is rotated leftward via the fulcrum 305a, and as indicated by the imaginary line of FIG. 4, is located to the left outward of the vehicle body. Likewise, the folded link mechanism 301b is opened rightward with the fulcrum 306b as a start point and the arms 302b and 303b are on the substantially straight line via the fulcrum 306b. The right seat bottom 31b is rotated rightward via the fulcrum 305b, and as indicated by the imaginary line of FIG. 4, is located to the right outward of the vehicle body.

In the state that the left seat bottom 31a and the right seat bottom 31b are located outward of the vehicle body, the screen shield 10 located in the rear portion of the rear seat 22 in 4 passengers transformation is moved forward. After the screen shield 10 is moved forward, as shown in FIG. 5, the link mechanism 301a is folded with the fulcrum 306a as a start point and the left seat bottom 31a is located at the left end of the box 30 so as to be in a substantially vertical state. Likewise, the link mechanism 301b is folded with the fulcrum 306b as a start point and the right seat bottom 31b is located at the right end of the box 30 so as to be in a substantially vertical state.

The seat bottoms 31a and 31b can be located to the left and right outward of the vehicle body by the link mechanisms 301a and 301b, so that the seat bottoms 31a and 31b cannot be an obstacle in the forward movement of the screen shield 10 over the entire vehicle width. Thus, the forward movement of the screen shield 10 can be easily performed.

When 2 passengers transformation shown in FIG. 5 is changed to 4 passengers transformation shown in FIG. 4, the above operation may be reverse. Also in this case, when the screen shield 10 is moved rearward, the seat bottoms 31a and 31b cannot be an obstacle so that the rearward movement of the screen shield 10 can be easily performed.

Modification Example 2 of the First Embodiment

Figure 6:
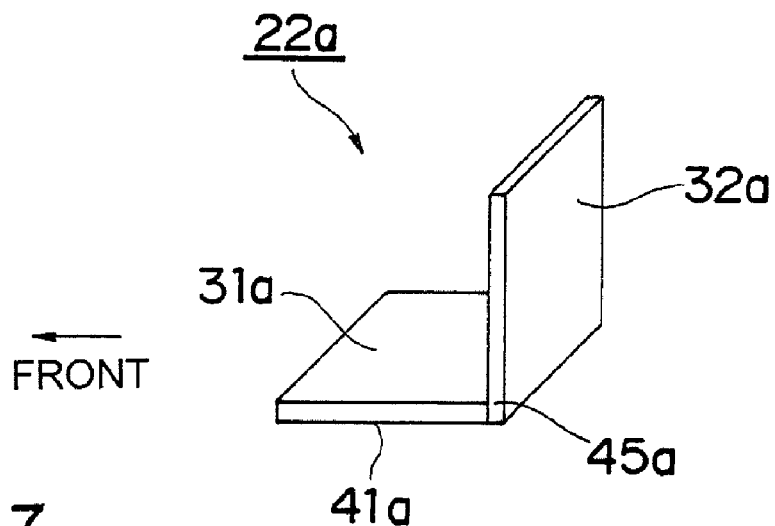
FIG. 6 is a schematic diagram of a rear left seat 22a in 4 passengers transformation showing another modification example of the first embodiment.
Figure 7:
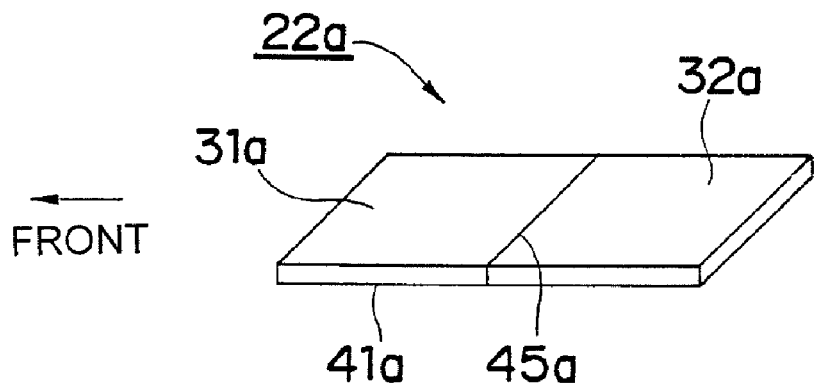
FIG. 7 is a schematic diagram of the rear left seat 22a while 4 passengers transformation is changed to 2 passengers transformation.
Figure 8:
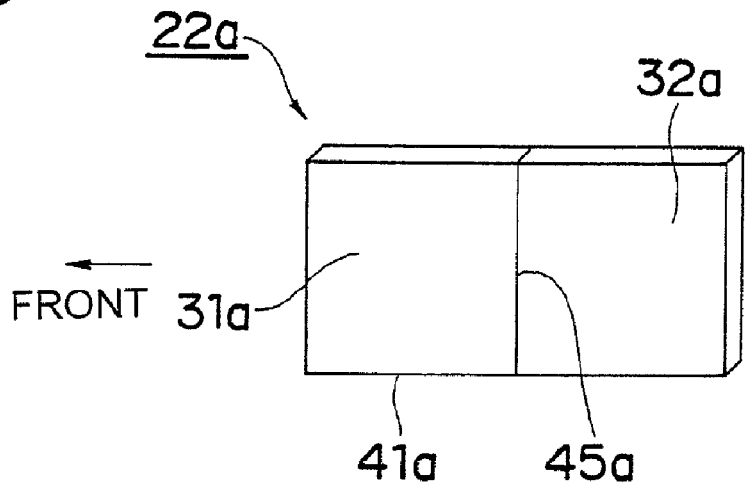
FIG. 8 is a schematic diagram of the rear left seat 22a in 2 passengers transformation.

FIGS. 6 to 8 are schematic diagrams of the rear left seat 22a showing a modification example of the first embodiment. The left backrest 32a is rotatable about the hinge 45a rearward. In the expansion of the cargo bed 9, the left backrest 32a is rotated about the hinge 45a rearward, and as shown in FIG. 7, the left seat bottom 31a and the left backrest 32a are arranged in a front-rear direction in a tandem manner so as to be substantially horizontal. The left seat bottom 31a and the left backrest 32a are rotated about the hinge 41a leftward, and as shown in FIG. 8, the side panel of the expandable portion of the cargo bed 9 is formed by the left seat bottom 31a and the left backrest 32a. The rear right seat 22b can have the same configuration. According to the above configuration, the side panels of the expandable portions of the cargo bed 9 which are long in a front-rear direction can be formed.

Modification Example 3 of the First Embodiment

Figure 9:
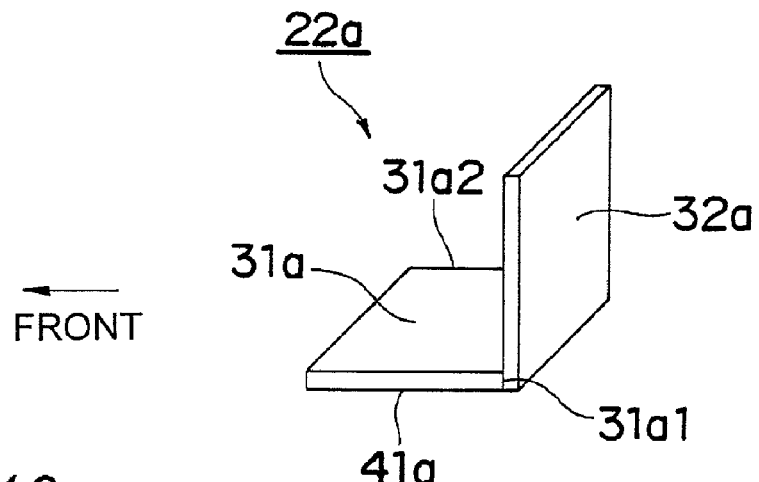
FIG. 9 is a schematic diagram of the rear left seat 22a in 4 passengers transformation showing a still another modification example of the first embodiment.
Figure 10:
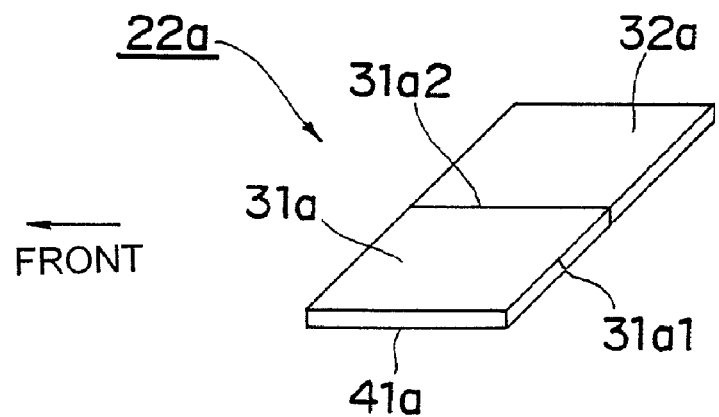
FIG. 10 is a schematic diagram of the rear left seat 22a while 4 passengers transformation is changed to 2 passengers transformation.
Figure 11:
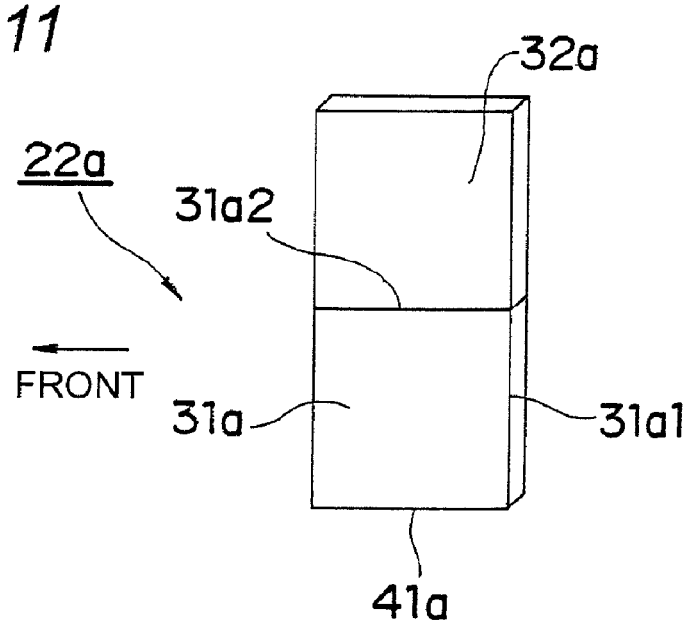
FIG. 11 is a schematic diagram of the rear left seat 22a in 2 passengers transformation.

FIGS. 9 to 11 are schematic diagrams of the rear left seat 22a showing a modification example of the first embodiment. The left backrest 32a is attachable to and detachable from a rear end 31a1 of the left seat bottom 31a and is attachable to and detachable from a right end 31a2 of the left seat bottom 31a. In the expansion of the cargo bed 9, the left backrest 32a is detached from the rear end 31a1 of the left seat bottom 31a. As shown in FIG. 10, the left backrest 32a detached from the rear end 31a1 is attached to the right end 31a2. The left seat bottom 31a with the left backrest 32a attached to the right end 31a2 is rotated about the hinge 41a leftward, and as shown in FIG. 11, the side panel of the expandable portion of the cargo bed 9 is formed by the left backrest 32 and the left seat bottom 31a. The rear right seat 22b can have the same configuration. According to the above configuration, the side panels of the expandable portions of the cargo bed 9 which are long in an up-down direction, that is, high, can be formed.

Second Embodiment

Figure 12:
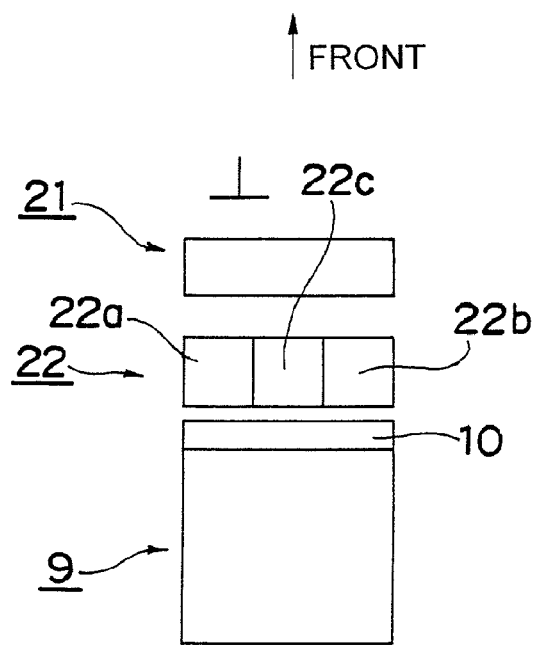
FIG. 12 is a top schematic diagram of the pick-up style utility vehicle in 4 passengers transformation according to a second embodiment of the present invention.
Figure 13:
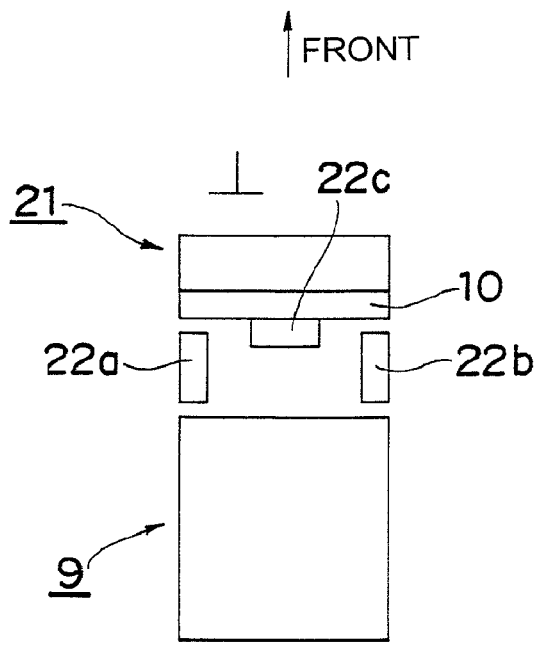
FIG. 13 is a top schematic diagram of the pick-up style utility vehicle in 2 passengers transformation.

FIGS. 12 and 13 are top schematic diagrams of the pick-up style utility vehicle according to a second embodiment of the present invention. The second embodiment has the same configuration as that of the first embodiment except that the following configuration (a) is different. Like components are indicated by like reference numerals.

(a) As shown in FIG. 12, the rear seat 22 is divided into three to the left and right. That is, the rear seat 22 has the rear left seat 22a, the rear right seat 22b, and a rear middle seat 22c. In 2 passengers transformation, as shown in FIG. 13, the rear left seat 22a forms the left side panel of the expandable portion of the cargo bed 9 and the rear right seat 22b forms the right side panel of the expandable portion of the cargo bed 9. The rear middle seat 22c is moved forward in 2 passengers transformation.

According to the second embodiment, the length of the rear left seat 22a and the rear right seat 22b in a left-right direction can be reduced. The height of the side panels of the expandable portions of the cargo bed 9 formed by the rear left seat 22a and the rear right seat 22b in 2 passengers transformation can be reduced.

Figure 14:
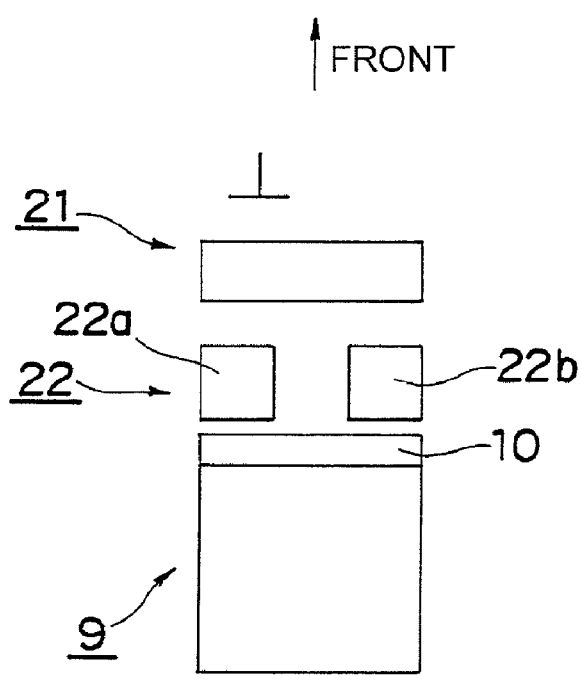
FIG. 14 is a top schematic diagram of the pick-up style utility vehicle in 4 passengers transformation showing a modification example of the second embodiment.
Figure 15:
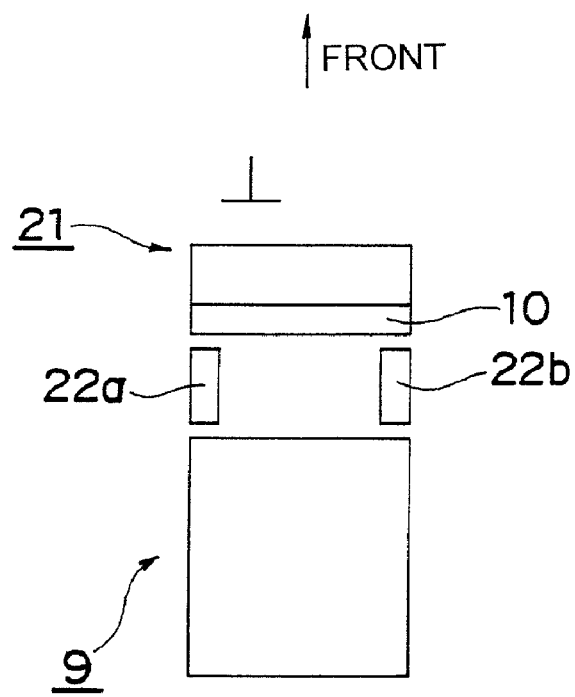
FIG. 15 is a top schematic diagram of the pick-up style utility vehicle in 2 passengers transformation.

According to the second embodiment, in 4 passengers transformation, the rear left seat 22a, the rear middle seat 22c, and the rear right seat 22b are provided continuously in a left-right direction. As shown in FIG. 14 (4 passengers transformation) and FIG. 15 (2 passengers transformation), the rear seat 22 may have a gap between the rear left seat 22a and the rear right seat 22b without having the rear middle seat 22c.

Third Embodiment

Figure 16:
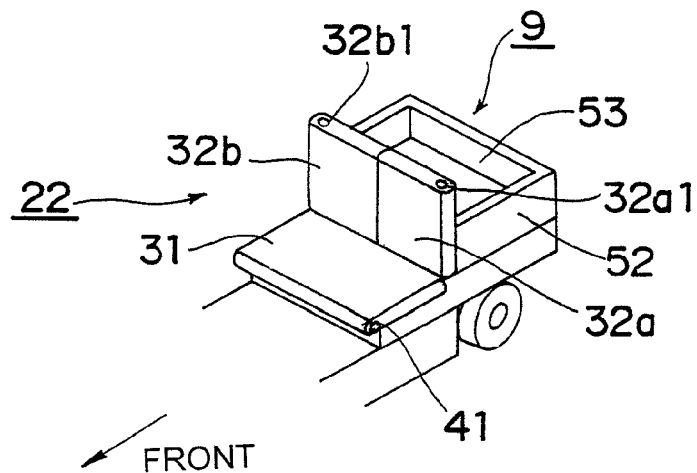
FIG. 16 is a schematic perspective view of the rear seat 22 and the expandable cargo bed 9 in 4 passengers transformation according to a third embodiment of the present invention.
Figure 17:
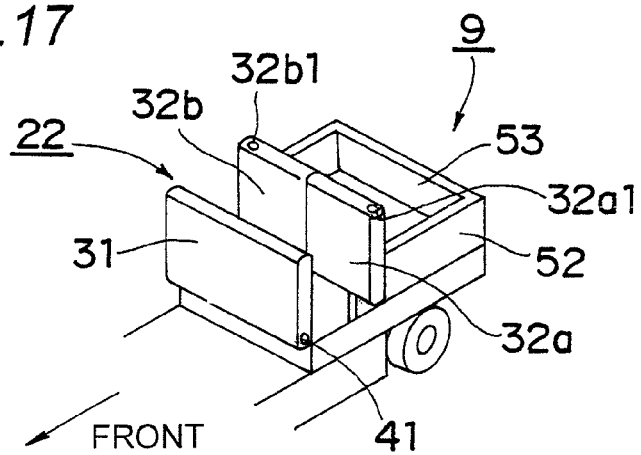
FIG. 17 is a schematic perspective view of the rear seat 22 and the expandable cargo bed 9 while 4 passengers transformation is changed to 2 passengers transformation.
Figure 18:
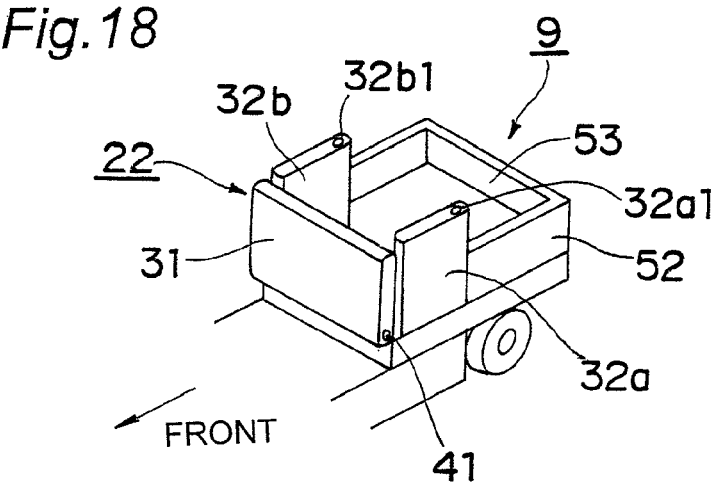
FIG. 18 is a schematic perspective view of the rear seat 22 and the expandable cargo bed 9 in 2 passengers transformation.
Figure 19:
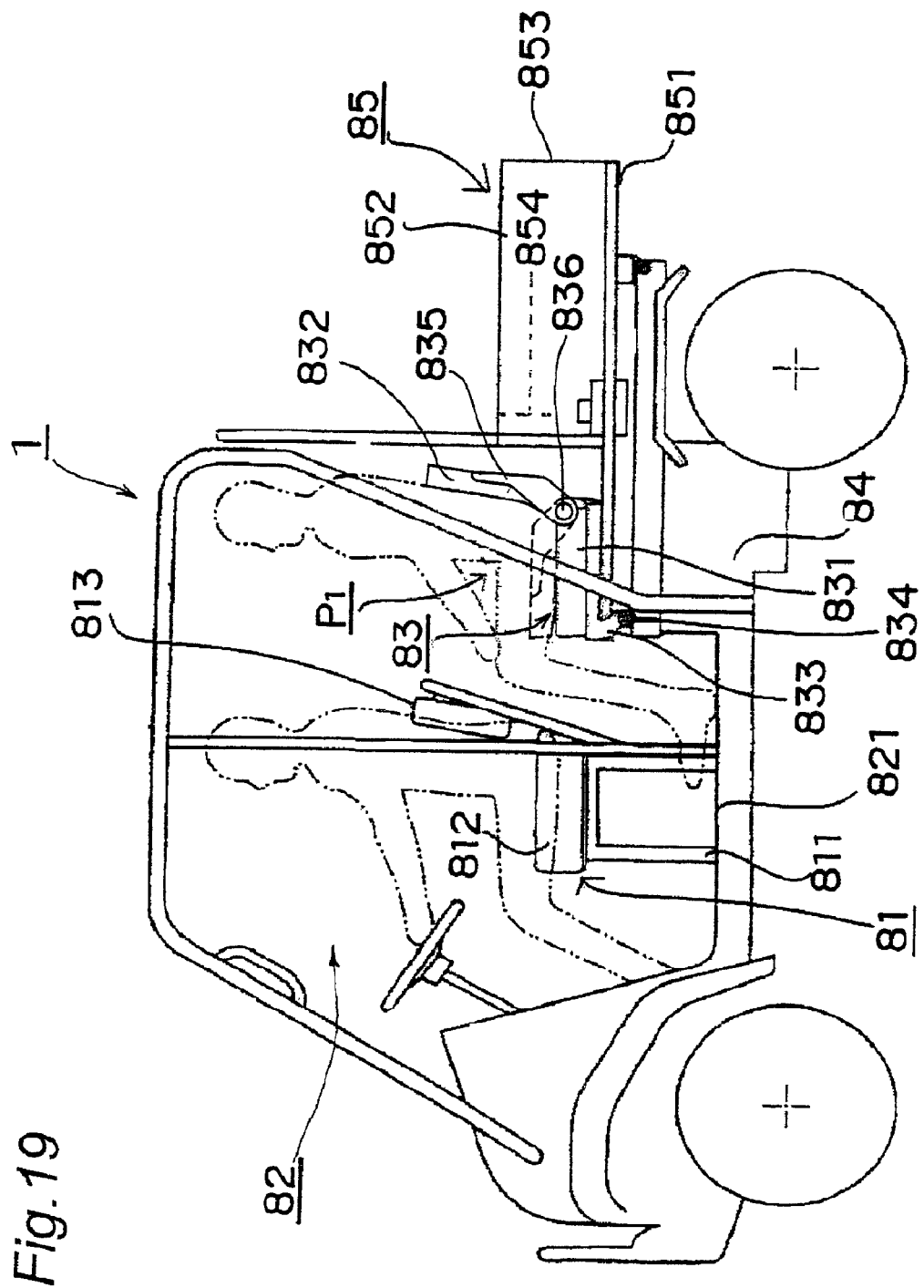
FIG. 19 is a left side view in 4 passengers transformation of a pick-up style utility vehicle of the related art.
Figure 20:
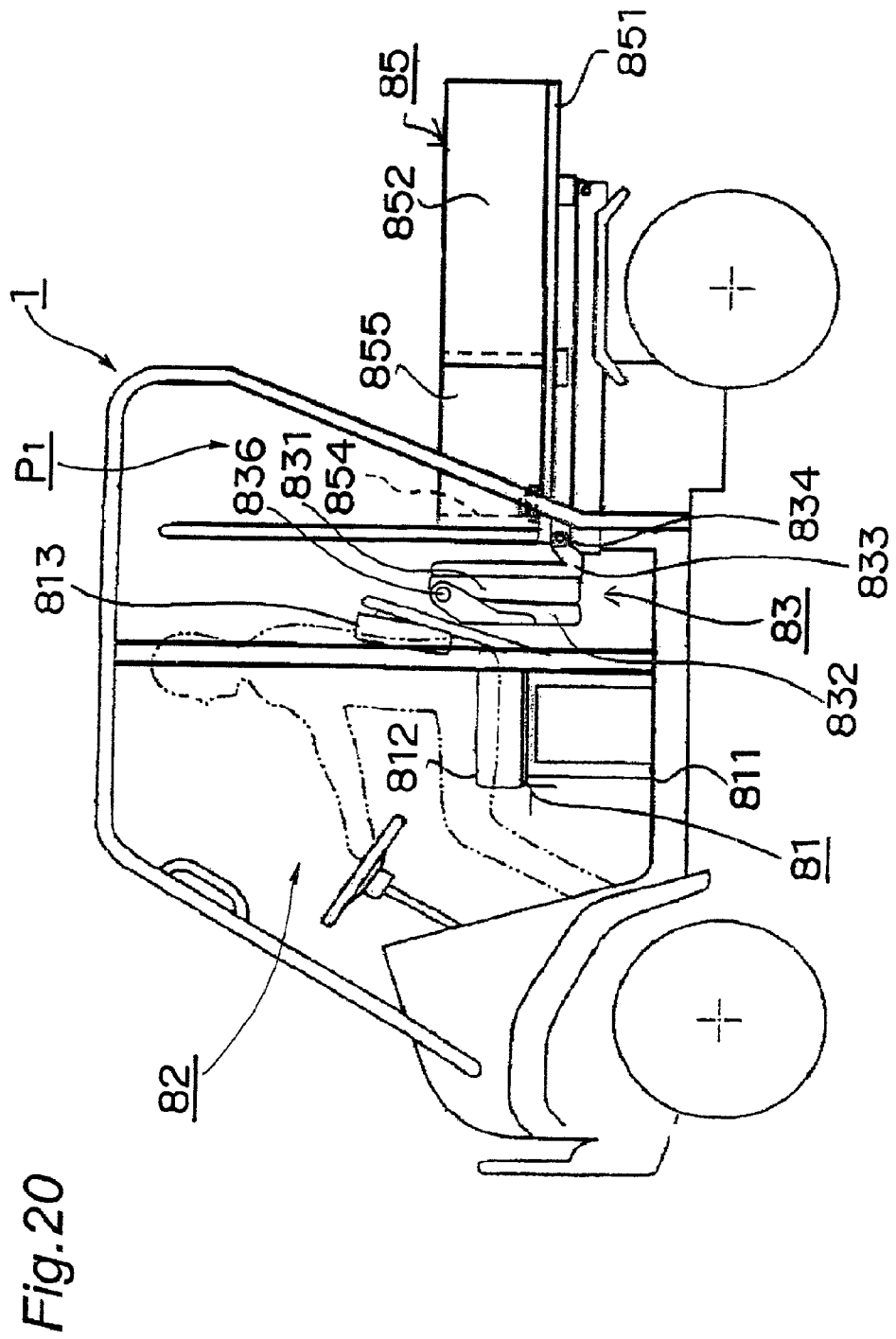
FIG. 20 is a left side view in 2 passengers transformation of the pick-up style utility vehicle of the related art.

FIGS. 16 to 18 show a third embodiment of the present invention. FIG. 16 is a schematic perspective view of the rear seat 22 and the expandable cargo bed 9 in 4 passengers transformation. FIG. 18 is a schematic perspective view of the rear seat 22 and the expandable cargo bed 9 in 2 passengers transformation. FIG. 17 is a schematic perspective view while 4 passengers transformation is changed to 2 passengers transformation. The third embodiment has the same configuration as that of the first embodiment except that the following configurations (b) and (c) are different. Like components are indicated by like reference numerals.

(b) As shown in FIGS. 16 to 18, the seat bottom 31 of the bench-shaped rear seat 22 is not divided to the left and right. The backrest 32 for the rear seat 22 is divided to the left and right and has the left backrest 32a and the right backrest 32b.

(c) The seat bottom 31 is rotated about the hinges 41 forward so as to be in a substantially vertical state. The left backrest 32a is rotated about a hinge 32a1 and can be opened forward and leftward. The right backrest 32b is rotated about a hinge 32b1 and can be opened forward and rightward.

When 4 passengers transformation shown in FIG. 16 is changed to 2 passengers transformation shown in FIG. 18, the seat bottom 31 is rotated about the hinges 41 forward so as to be in a substantially vertical state, as shown in FIG. 17, and forms the front panel when the cargo bed 9 is expanded. The left backrest 32a is rotated about the hinge 32a1 leftward and forms the side panel of the expandable portion of the cargo bed 9 forward from the front end of the left stationary side panel 52. The right backrest 32b is rotated about the hinge 32b1 rightward and forms the side panel of the expandable portion of the cargo bed 9 forward from the front end of the right stationary side panel 52.

According to the third embodiment, the side panels of the expandable portions of the cargo bed 9 are formed only by the backrests 32a and 32b for the rear seat 22. Thus, the side panels are simpler and more lightweight than the case that the side panels of the expandable portions of the cargo bed 9 are formed by both the backrest and the seat bottom, so that the side panels of the expandable portions of the cargo bed 9 can be formed more easily.

The present invention is not limited to the configurations of the above embodiments and includes various modification examples contemplated in the scope without departing from the contents described in the scope of the claims.

What is claimed is:
1. A pick-up style utility vehicle comprising:
a front seat;
a rear seat; and
a cargo bed in this order from front; wherein
the cargo bed is changeable between an expanded state in which the cargo bed is expanded forward to a rear riding space in front of the cargo bed and a non-expanded state not occupying the rear riding space; and the rear seat forms side panels of the expandable portions of the cargo bed in the expanded state.

2. The pick-up style utility vehicle according to claim 1, wherein
the rear seat can be divided into a first member and a second member to left and right, and
in the expanded state, the first member forms one side panel of the expandable portion of the cargo bed and the second member forms the other side panel of the expandable portion of the cargo bed.

3. The pick-up style utility vehicle according to claim 1, wherein
in the expanded state, a backrest for the rear seat forms the side panel of the expandable portion of the cargo bed.

4. The pick-up style utility vehicle according to claim 1, wherein
the rear seat has a seat bottom and a backrest, and
in the expanded state, the seat bottom and the backrest are arranged in a front-rear direction in a tandem manner to form the side panel of the expandable portion of the cargo bed.

5. The pick-up style utility vehicle according to claim 1, wherein
the rear seat has a seat bottom and a backrest, and
in the expanded state, the backrest and the seat bottom are arranged in an up-down direction in a tandem manner to form the side panel of the expandable portion of the cargo bed.

6. The pick-up style utility vehicle according to claim 2, wherein
the first member is coupled to a bottom portion of the utility vehicle by foldable first coupling means,
the second member is coupled to the bottom portion of the utility vehicle by foldable second coupling means,
the first member can be located outward of a vehicle body in a vehicle width direction by opening the folded first coupling means, and
the second member can be located outward of the vehicle body in the vehicle width direction by opening the folded second coupling means.

* * * * *